April 27, 1965 W. V. CHUMAKOV 3,180,957
AUXILIARY CONTACT DEVICE WITH DEFORMABLE
CONTACT OPERATED BY AN EXPLOSIVE
Filed July 29, 1960 3 Sheets-Sheet 1

INVENTOR.
WALTER V. CHUMAKOV
BY
OSTROLENK, FABER, GERB & SOFFEN
ATTORNEYS

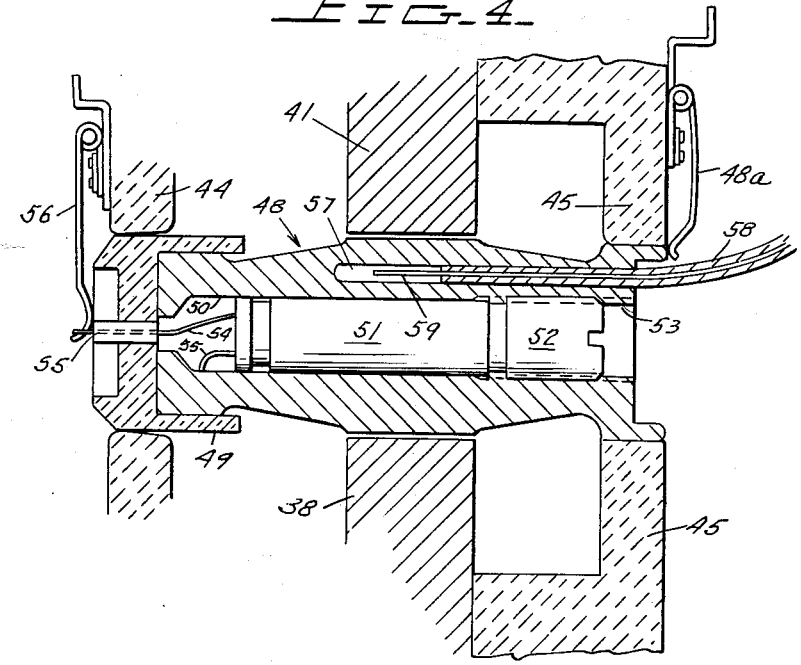
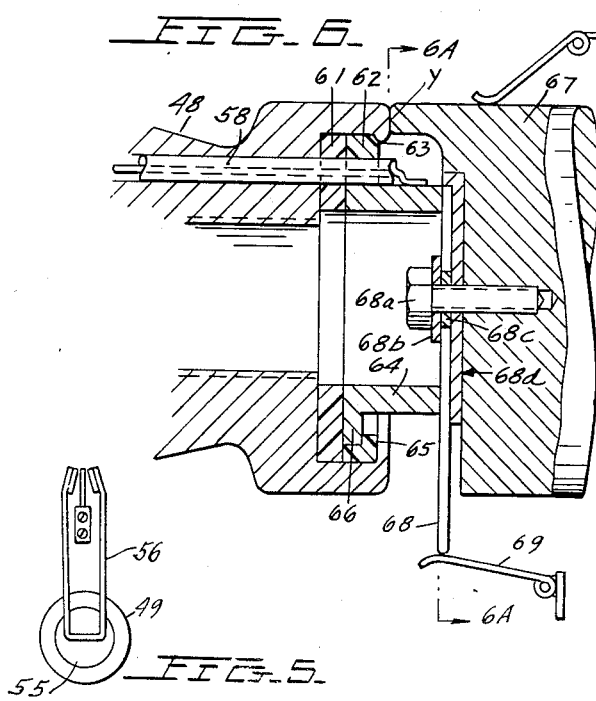
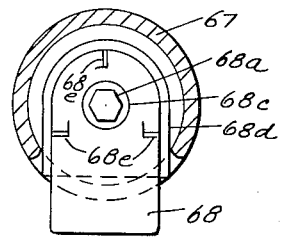

April 27, 1965 W. V. CHUMAKOV 3,180,957
AUXILIARY CONTACT DEVICE WITH DEFORMABLE
CONTACT OPERATED BY AN EXPLOSIVE
Filed July 29, 1960 3 Sheets-Sheet 3
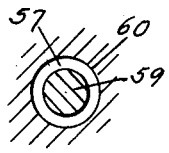
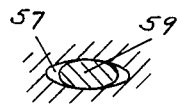
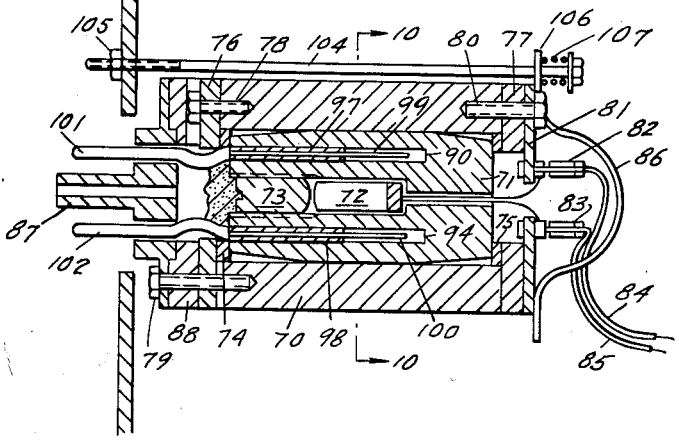
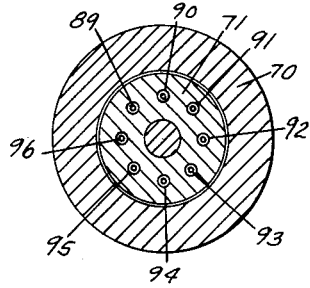
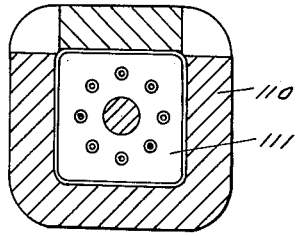
INVENTOR.
WALTER V. CHUMAKOV
BY
OSTROLENK, FABER, GERB & SOFFEN
ATTORNEYS United States Patent Office 3,180,957
Patented Apr. 27, 1965

3,180,957
AUXILIARY CONTACT DEVICE WITH DEFORM-
ABLE CONTACT OPERATED BY AN EXPLOSIVE
Walter V. Chumakov, Philadelphia, Pa., assignor to I-T-E
Circuit Breaker Company, Philadelphia, Pa., a corporation of Pennsylvania
Filed July 29, 1960, Ser. No. 46,300
1 Claim. (Cl. 200—142)

My invention relates to an auxiliary contact for a contacting device whereby the auxiliary contact is operable to control auxiliary equipment responsive to operation of the main contact device, and more particularly relates to auxiliary contact means for the deformable contact of an explosive short circuit of the type shown in U.S. Patent 2,888,538 to O. Jensen, entitled "Explosive-Type Short Circuiter," and assigned to the assignee of the present invention.

Explosive short circuiters of the type shown in the above noted patent are well known to the art, and are primarily used for placing a direct short circuit across sensitive electrical equipment responsive to a fault condition in the system including this sensitive equipment. By short-circuiting the equipment, it will be protected from the flow of fault current, and other interruption means may later come into play to clear the fault.

When using such a short circuiter-type of device, a hollow conductive member is normally positioned with its external walls out of contact with relatively stationary contacts which are connected to the terminals of the elements which are to be protected by the short circuiter. An explosive charge is placed within the hollow contact member and this charge is detonated responsive to a fault condition. The explosion of the charge will cause the walls of the hollow member to deform outwardly and into contact with the relatively stationary members whereby extremely rapid connection between the various stationary contacts through the deformed hollow contact member is achieved.

It is desirable in many applications of such an explosive-type short circuiter that auxiliary contacts also be closed to cause operation of other electrical equipment such as circuit breakers connected in series with the equipment which is initially short circuited so that any fault condition will be cleared by the circuit breakers. Other circuits may be actuated from the auxiliary contacts such as alarm circuits.

The essence of the present invention is to form a small opening within the body of the deformable contact member and to then position a terminal of an auxiliary circuit within said opening and in spaced relationship with the walls of the opening. When the explosive charge is detonated and the walls of the hollow contact member deform, the opening which receives the electrical terminal of the auxiliary circuit will deform into contact with the terminal whereby an electrical circuit may be completed between this terminal and other electrical circuitry to complete some auxiliary circuit. The terminal could, for example, be comprised of a length of wire which terminates a portion of the auxiliary circuit, this wire being retained in an elongated hole drilled in the deformable contact. The hole is normally circular in cross-section, but after deformation occurs the cross-section of the opening will be deformed into an oval shape to bring the walls of the opening into contact with the elongated wire of the auxiliary circuit.

Clearly, any number of auxiliary circuit terminals can be associated with a respective plurality of openings in the deformable contact so that any desired number of auxiliary circuits can be operated.

Accordingly, a primary object of my invention is to provide a novel auxiliary contact means.

Another object of this invention is to provide a novel high speed contacting device.

A further object of this invention is to provide a novel high speed relay means wherein a first contact means is comprised of an opening in a deformable conductive body and the second contact means is formed of the terminal of an electrical circuit which is held within the opening and normally in spaced relationship with respect to the walls of the opening.

These and other objects of my invention will become apparent from the following description when taken in connection with the drawings, in which:

FIGURE 1 schematically shows a six-phase, full-wave rectifier wherein the rectifying elements thereof are protected by a short circuiter means.

FIGURE 4 shows a side cross-sectional view of the deformable cartridge of FIGURE 3 when adapted with the auxiliary contact structure of the present invention.

FIGURE 5 is a front view of the cartridge of FIGURE 4 when seen from the left-hand side of FIGURE 4.

FIGURE 6 is an enlarged view of the right-hand end of the contact structure of FIGURE 4 and specifically illustrates one manner in which the auxiliary terminal wire may be taken out of the cartridge if the short circuiter is of the automatic reloading type.

FIGURE 6A is a front view of the reloading ram or plunger which carries a contact plate for establishing connection with the auxiliary terminal of the cartridge.

FIGURE 7 is a side cross-sectional view partially showing the relative configurations between the bare portion of the terminal wire and the opening which receives it in FIGURE 4 in the undeformed condition of the movable contact means.

FIGURE 8 illustrates the relative configuration of the elements of FIGURE 7 after deformation of the contact.

FIGURE 9 illustrates the manner in which the concept of carrying a terminal within a deformable conductive body may be utilized in a high speed relay.

FIGURE 10 is a side cross-sectional view of FIGURE 9 when taken across the lines 10—10 in FIGURE 9.

FIGURE 11 illustrates an alternate cross-sectional arrangement for the high speed relay.

Figure 1:
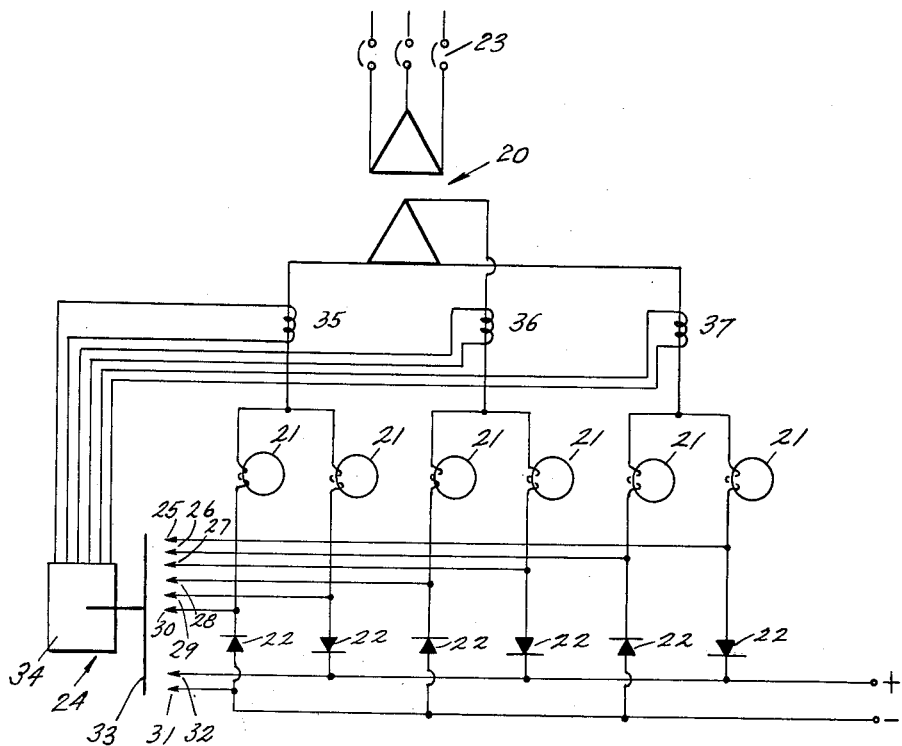

Referring now to FIGURE 1, I have illustrated a rectifier circuit of the type shown in aforementioned U.S. Patent 2,888,538 which generally comprised an A.-C. power transformer 20 which drives a six-phase rectifier wherein each of the phases includes a saturable-type reactor 21 and cell 22 which may be of silicon or germanium wherein the reactor 21 is so controlled as to control the voltage output of the phase with which it is associated in the usual manner.

Each of cells 22 are illustrated as a single element. It is, however, to be understood that each of the cells may actually schematically represent a plurality of parallel connected cell elements for higher current ratings than a single cell could achieve, and in addition, many banks of these parallel connected elements may be in series for each of the cell positions of FIGURE 1 to achieve higher voltage ratings than a single cell could achieve.

As is well known, when there is a fault in the system, it is important that the cells be immediately protected against this fault since they are extremely sensitive and can be easily damaged under fault conditions.

The A.-C. circuit breakers 23 which may have fault responsive means associated therewith are generally too slow to afford the protection required for cells 22, so that it is desirable that high speed means be provided for short circuiting cells 22 to thereby protect them until the fault is cleared by A.-C. circuit breaker 23 or by D.-C. circuit breakers (not shown), or any other similar fault protective means.

The short circuiter is schematically illustrated as short circuiter 24 in FIGURE 1, and includes schematically illustrated contacts 25, 26, 27, 28, 29 and 30 which correspond to the A.-C. phases respectively, and contacts 31 and 32 which correspond to the negative and positive buses of the rectifier system respectively. A further contact 33 which is engageable with all of the aforementioned contacts 25 through 32 is then positioned so that all of contacts 25 through 32 may, responsive to operation of operating mechanism 34, be electrically interconnected through the common contact 33. Clearly, when this occurs, each of cells 22 will be short circuited through the contact of their respective phase, and their D.-C. contact through the common conductor 33.

In order to cause the short circuiting condition, many operating systems are possible. By way of example, and as shown for illustrative purposes only, each of the A.-C. phases may be provided with respective current transformers 35, 36 and 37 which deliver energizing signals to operating mechanism 34. When there is a fault condition on the system, the output current of the current transformers 35, 36 or 37 will achieve some predetermined fault magnitude to cause operation of operating mechanism 34 to move contact 33 into short circuiting engagement with contacts 25 through 32, as mentioned previously. Thus, the cells 22 will all be short circuited and protected from the fault condition causing this operation, and the circuit is finally cleared by the relatively slow operating circuit breaker 23.

Figure 2:
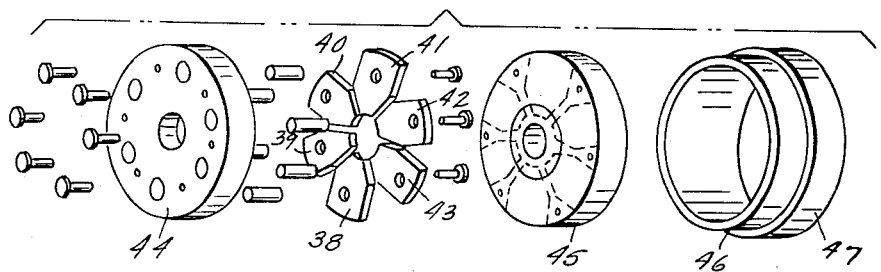
FIGURE 2 shows a perspective view of the body of an explosive type short circuiter which can be utilized in connection with the rectifier system of FIGURE 1.
Figure 3:
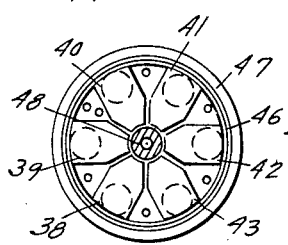
FIGURE 3 shows a front view of the assembled short circuiter of FIGURE 2.

A typical arrangement of a short circuiter such as short circuiter 24 in a system requiring the interconnection of six points of potential is shown in FIGURES 2 and 3. The short circuiter of FIGURES 2 and 3 is fully described in the above noted U.S. Patent 2,888,538, and reference is made thereto for further details of this construction. Generally, the short circuiter includes six relatively stationary contact elements 38, 39, 40, 41, 42 and 43 which are clamped between insulating bodies 44 and 45 in such a manner as to retain the stationary contact elements 38 through 43 electrically insulated from one another and forming a centrally disposed opening having a circular configuration. An insulating mounting ring 46, and an external mounting ring 47 which may be of steel then complete the housing of the unit as shown in FIGURE 3.

A cartridge or deformable movable contact 48 is then positioned within the central opening defined by the stationary contact elements, and is normally held out of contact with these elements. As will be seen more fully hereinafter, cartridge 48 which is a conductive body has a centrally disposed explosive charge therein which is detonated responsive to predetermined fault conditions such as a signal received from current transformers 35, 36 or 37 of FIGURE 1 to cause the walls of cartridge 48 to deform outwardly and into rigid contact connection with each of stationary contacts 38 through 43 to electrically connect all of these contacts together.

The cartridge 48 is more fully shown in FIGURES 4, 5 and 6. Referring now to FIGURE 4, it is seen that contacts 38 and 41 of FIGURE 2 are positioned immediately adjacent to the external surface of cartridge 48 as are the remaining stationary contact elements of FIGURE 2. The cartridge 48 which is electrically in engagement with spring type contact 48a has a cap of insulating material 49 over its left-hand end which is received by the central opening of insulating spacer 44, while the right-hand end of the cartridge is carried in the opening of insulating spacer 45. A central opening 50 within cartridge 48 receives an explosive cap 51 which is retained within opening 50 by threaded insert 52 which is threaded into the threaded portion 53 of opening 50. A first detonating terminal 54 of explosive cap 51 is electrically connected to conductive insert 55 carried by insulating cap 49, and the second lead 55 of cap 51 is electrically connected to the cartridge body and then to spring-type contact 48a.

A spring-type contact 56 which is carried from an external area, and best seen in FIGURES 4 and 5, engages conductive projection 55 and is connectable to external energizing circuit means to cause detonation of cap 51. Clearly, when cap 51 is detonated, the explosive force will cause the walls of conductive member 48 to extend outwardly and into engagement with the stationary contacts positioned around its periphery such as stationary contacts 38 and 41 of FIGURE 4.

In accordance with the present invention, an opening such as opening 57 is drilled into cartridge body 48 and receives an insulated conductive wire 58 which serves as one terminal of an auxiliary circuit. The left-hand end of conductor 58 has the insulation stripped therefrom so that a bare wire portion 59 is held in spaced relation with respect to the walls of opening 57. Thus, as is seen in FIGURE 7, the cross-section of stripped end 59 is normally spaced from the walls 60 of opening 57. When the cap 51 is detonated, the compressive forces applied to the conductive body 48 will be such as to cause deformation of opening 57 in the manner shown in FIGURE 8 whereby the walls of opening 57 collapse to an oval shape and thus engage conductive wire portion 59.

This engagement may then serve to close an auxiliary circuit from terminal 48a to the terminal at the conductor 58 in a manner well known to those skilled in the art. The auxiliary circuit could, for example, be operable to cause initiation of operation of circuit interrupter 23 of the circuit of FIGURE 1 or could cause the energization of remote alarm equipment or serve any other auxiliary function including initiation of short circuiter reloading operation.

Another manner in which conductor 58 may be taken out from the cartridge 48 is shown in FIGURE 6 for an automatic reloading type short circuiter where a first and second insulating spacer 61 and 62 having aligned openings therein for receiving wire 58 are retained in the end portion of cartridge 48 by peening over section 63. An end cap 64 is then secured to insulating member 64 by its flanged portion 65 which receives a cooperating flange 66 of end cap 64 and the central conductor 59 of wire 58 is soldered to the conductive end cap 64.

Reloading ram or plunger 67 bears against the right-hand side of the cartridge 48 at surface Y. Reference is made to the above-noted Patent No. 2,888,538 for further details of the reloading mechanism. Metal contact plate 68 is fastened to the ram 67 by means of a screw 68a and is insulated from the ram and screw by means of members 68b, 68c and 68d.

Spring contact fingers 68e of the plate 68 bear against the end cap 64 and thus complete an electric circuit between the auxiliary contact, the plate 68 and stationary mounted spring-type contact 69. Spring contact 69 then serves as one electrical terminal for the auxiliary contact with contact 48a of FIGURE 4 being the other terminal.

It will be understood by those skilled in the art that the concept of causing deformation within a body of conductive material so that a conductive terminal means normally disengaged from the conductive material becomes engaged responsive to deformation can be utilized as a high speed relay independently of the short circuiter construction of FIGURE 2. A typical high speed relay using the present novel concept is shown in FIGURES 9 and 10.

Referring now to FIGURES 9 and 10, the main relay housing 70 is a rigid steel cylinder which receives a deformable conductive cartridge 71. The deformable conductive cartridge 71 has a central opening therein which receives an explosive cap 72 which is retained within cartridge 71 by a threaded plug 73 which threads into a tapped portion of the opening which receives cap 72. A pair of spacing rings 74 and 75 bear against either end of cartridge 71, and end plates 76 and 77 bear against rings 74 and 75, respectively, and the ends of cartridge 71 to retain cartridge 71 in position within housing 70. More specifically, end rings 76 and 77 may be secured by screws such as screws 78 and 79 for end plate 76 and screw 80 and a screw similar to 79 (not shown) for end plate 77.

Screw 80 additionally serves to hold a terminal plate 81 which carries electrical terminals 82 and 83 with respect to cartridge 71. Terminals 82 and 83 receive the firing circuit connection which includes wires 84 and 85 which are taken through the central opening in the right-hand end of cartridge 71 to cap 72. The right-hand end of the assembled relay is then covered by a protective cap 86 which is secured to the relay in any desired manner. The left-hand end of the relay has a terminal socket 87 of the type used for vacuum tubes or any similar plug-in type of device secured thereto by screws similar to screw 79, and is appropriately spaced from end plate 76 by the interposed disc 88.

A plurality of openings 89 through 96 are then drilled into cartridge 71, as shown in FIGURE 9 for the case of openings 90 and 94, and these openings receive insulated wires such as insulated wires 97 and 98 positioned in openings 90 and 94 respectively. The right-hand end of these wires have the insulation stripped therefrom whereby the central conductors 99 and 100 of wires 97 and 98 respectively are retained in spaced relation with the interior of openings 90 and 94 respectively. These wires are then connected to the plug-type terminals such as plug terminals 101 and 102 for wires 97 and 98 respectively which are connectable into a cooperating socket for the relay (not shown).

Mechanical support may be provided for the relay structure with respect to a support panel 103, as by a holding screw 104 which is secured to panel 103 by nut 105 and is carried from the relay by a protruding ear 106, the bolt being backed up by a spring 107 to resiliently secure the relay to panel 103.

In operation it is clear that when a firing signal appears on terminals 84 and 85, the explosive cap 72 will be detonated whereby the walls of cartridge 71 will deform to cause connection of the exposed wire portions such as wire portions 99 and 100 of the various wires carried within openings 89 and 96 to engage the cartridge body 71. Thus, a plurality of circuits may be controlled in an extremely high speed manner.

It is to be noted that the firing terminals 82 and 83 could, if desired, be connected to other prongs of the socket 87.

In the embodiment of FIGURES 9 and 10, after operation of the relay, all of the parts of the relay are reusable except for the cartridge and wires. Thus, after the extremely high speed available from the relay is taken advantage of in operation, the relay can be made operable again by merely replacing the wire connections and a new cartridge.

While FIGURES 9 and 10 have shown the high speed relay embodiment as being circular, it will be apparent that it may take any desired shape. By way of example, FIGURE 11 shows a square welded housing 110 which receives a cooperating square cartridge member 111 which serves the same function as does the cartridge 71 described above.

Although I have described preferred embodiments of my novel invention, many variations and modifications will now be obvious to those skilled in the art, and I prefer, therefore, to be limited not by the specific disclosure herein but only by the appended claim.

I claim:

A contact device comprising a conductive body having a central opening therein, an explosive device disposed within said central opening whereby detonation of said explosive device causes deformation of said conductive body, an elongated opening in said conductive body disposed parallel to the axis of said central opening and being radially displaced from said central opening, an elongated conductive wire having a predetermined length and insulation sheath means surrounding a predetermined portion of the said length of said elongated conductive wire to define an insulated surface portion and an uninsulated surface portion along the length of said wire; said length of said elongated conductive wire being disposed in said elongated opening; said insulation sheath surrounding said elongated wire mechanically engaging the interior walls of said elongated opening; said uninsulated surface portion of said elongated wire being held in spaced relation from the said interior walls of said elongated opening by the thickness of said insulation sheath.

References Cited by the Examiner

UNITED STATES PATENTS

| | | | |
|---|---|---|---|
| 2,034,090 | 3/36 | Douglas | 29—155.55 |
| 2,704,358 | 3/55 | Wells | 29—155.55 |
| 2,888,538 | 5/59 | Jensen | 200—142 |
| 2,920,166 | 1/60 | Geballe | 200—142 |

FOREIGN PATENTS 808,698  2/59  Great Britain.

BERNARD A. GILHEANY, *Primary Examiner.*

MAX L. LEVY, *Examiner.*